United States Patent [19]

Diffenderfer et al.

[11] 3,727,490
[45] Apr. 17, 1973

[54] DISC BRAKE PAD SPREADER

[75] Inventors: Walter L. Diffenderfer; Frederick R. McFarland, both of Lancaster, Pa.

[73] Assignee: K-D Manufacturing Company, Lancaster, Pa.

[22] Filed: Aug. 5, 1971

[21] Appl. No.: 169,187

[52] U.S. Cl............................81/3 K, 81/72, 294/95, 29/280, 29/239
[51] Int. Cl. ............................................B25b 27/00
[58] Field of Search......................81/3 K, 72; 29/239, 29/259, 261, 262, 263, 280, 282; 294/95, 89, 97, 29, 31; 269/47, 48.1

[56] References Cited

UNITED STATES PATENTS

| 1,676,775 | 6/1928 | Doherty | 81/72 |
| 2,613,983 | 10/1952 | Knudsen | 29/283 X |

FOREIGN PATENTS OR APPLICATIONS

| 9,808 | 1908 | Great Britain | 269/48.1 |
| 781,959 | 8/1957 | Great Britain | 269/48.1 |

*Primary Examiner*—Robert C. Riordon
*Assistant Examiner*—Roscoe V. Parker
*Attorney*—Henry N. Paul, Jr. et al.

[57] ABSTRACT

A spreading tool is provided, particularly adapted for use with disc brakes, as for example of automobiles, trucks and the like, wherein the spreader is a hand-actuable tool for insertion between the brake shoes or pads mounted in a caliper, for spreading the same, for allowing placement of the shoes over a rotor, or removal of the same from a rotor. The tool uses one or more X-shaped linkages, commonly pivotal about a shaft or axis, upon rotation of the tool handle, which actuates a drive screw, that in turn, cams linkage legs apart.

11 Claims, 4 Drawing Figures

PATENTED APR 17 1973 3,727,490
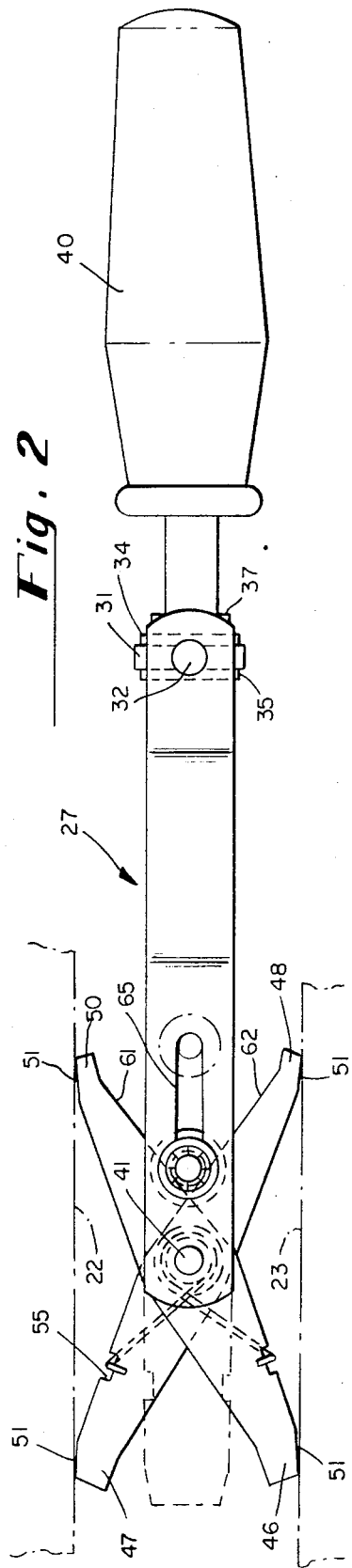
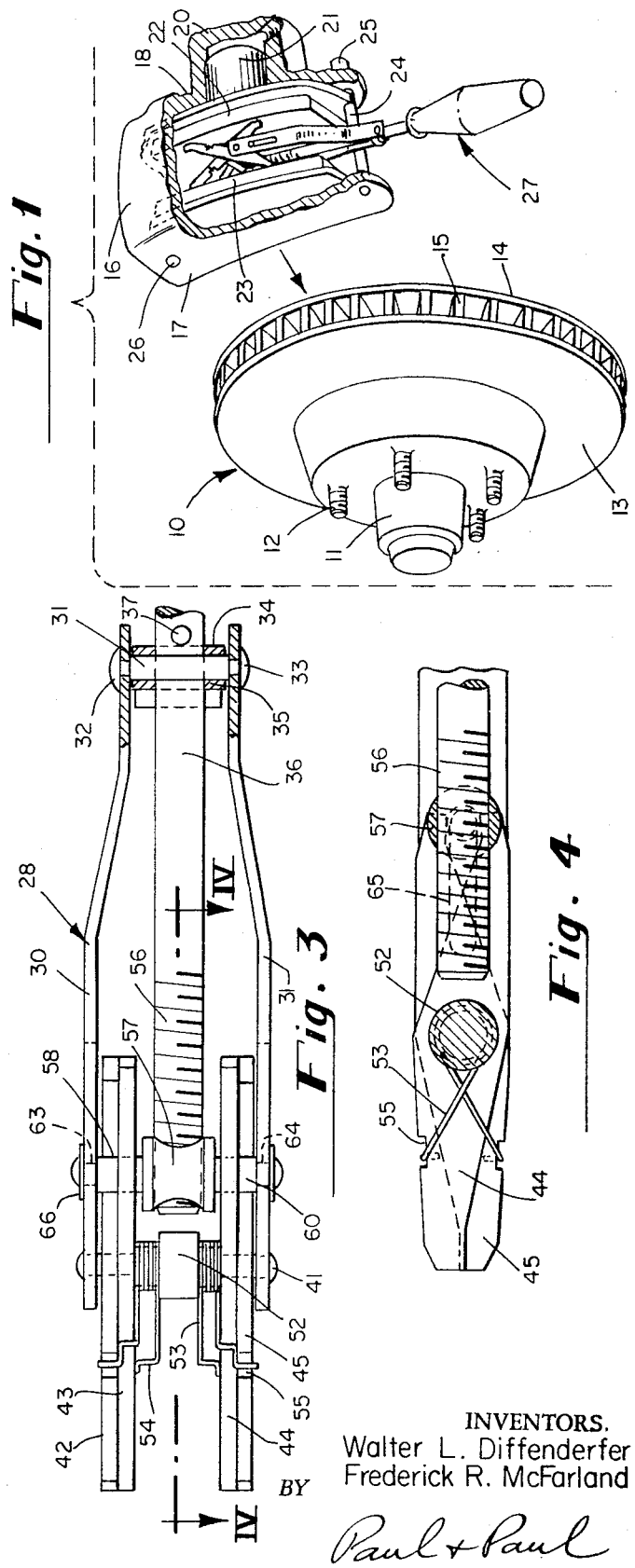
INVENTORS.
Walter L. Diffenderfer
Frederick R. McFarland
BY Paul & Paul
ATTORNEYS.

DISC BRAKE PAD SPREADER

BACKGROUND OF THE INVENTION

With the development and increased use of disc brakes on automobiles, trucks and other machinery particularly of the vehicular type, and particularly with the development of disc brakes of the floating caliper type, as distinguished from the fixed caliper type, opposing pads or shoes of disc brakes of more recent developments have in many instances had very little, if any clearance from the rotors that they are adapted to engage, such that mounting of calipers with disc brake shoes therein over rotors has become a difficult problem in many instances.

Again, most particularly with brakes of the floating caliper type, but not exclusively, because of the desire to limit unnecessary piston travel and consequent unnecessary brake shoe travel, in order that the shoes are adapted to almost instantaneously engage the rotors over which they are mounted, upon actuation of the same by a driver, it has also been known to design shoes that mount over the rotor with even a "drag," or interference fit with respect to the rotor of a few thousandths of an inch or more. Furthermore, very often the pistons that are adapted to be actuated for actuation of the brake shoes are provided with springs within the piston housing, tending to move the shoes closer to each other. The forces of these springs, as well as possible interference forces as aforesaid must be overcome by the mechanic, when installing a caliper over a rotor. It is possible, in some instances, to spread the shoes by inserting a screwdriver, bar or some other wedge therebetween, to place the shoes over the rotor while within the caliper, but very often the use of such tools becomes highly impractical. The reason for such impracticality often resides in the fact that the caliper is closed for protection of the shoes, and that insufficient room is present to facilitate the insertion of most tools. A further reason as to such impracticality exists in that such tools of the wedging type often mar or otherwise damage the surface of the brake shoes, rendering them unfit for use as intended, and even in fact dangerous.

Accordingly, the present invention has been developed, in order to facilitate spreading of brake shoes of disc brakes while mounted in a caliper, for assembly of the caliper over a rotor, or even for disassembly with respect thereto, wherein a relatively even pressure may be applied to the shoes, in order to effect separation without marring or otherwise damaging the working surfaces of the shoes.

SUMMARY OF THE INVENTION

Accordingly, a hand tool has been developed adapted for insertion within a caliper, for spreading plates for engaging shoes within a caliper, simultaneously, and to provide an efficient application of spreading forces to the shoes while inside the caliper.

It is therefore an object of this invention to provide a novel spreading tool.

It is a further object of this invention to provide a novel spreading tool for spreading brake shoes mounted within a caliper, for assembly or disassembly of the caliper relative to a rotor.

It is a further object of this invention to provide a novel tool having a rotatable handle adapted for actuating a drive, which in turn is adapted for camming spreader plates apart.

Other objects and advantages of the present invention will become readily apparent to those skilled in the art from a reading of the following brief descriptions of the drawing figures, detailed description of the preferred embodiment, and the appended claims.

IN THE DRAWINGS

FIG. 1 is a perspective view of an automobile rotor and caliper adapted to be assembled over the rotor, with the tool of this invention being illustrated in working position between opposing shoes within the caliper, with portions of the caliper being broken away for clarity.

FIG. 2 is an approximately full size view of the tool of this invention, illustrated with spreading plates expanded in a more widely spread position, and with brake shoes and the closed or contracted position of the spreading plate being illustrated in phantom.

FIG. 3 is a fragmentary top view of the tool illustrated in FIG. 2, with portions broken away in section, for clarity of illustration.

FIG. 4 is a fragmentary longitudinal sectional view, of the tool of FIG. 3, taken generally along the line IV—IV of FIG. 3.

Referring to the drawings in detail, reference is first made to FIG. 1, wherein there is illustrated a rotor, as for example of an automobile, generally designated by the numeral 10, mounted on a wheel hub 11, and having conventional threaded studs 12 protruding outwardly therefrom. The rotor 10 is provided with opposite braking surfaces 13 and 14, and in the particular embodiment shown, cooling vanes 15 are provided, about the periphery of the rotor 10.

A caliper 16, of the floating caliper type is illustrated, although the tool of this invention is adapted for either floating or fixed calipers as desired, although such tool becomes even more important with respect to floating caliper usage. The caliper 16 has an outer portion 17 and an inner portion 18. A housing 20 is provided for a piston and cylinder. Inside the housing 20 there is a cylinder 21, that may or may not have a compression spring therein adapted to urge an inner housing brake shoe or pad 22 outwardly, toward an outer housing brake shoe or pad 23. The piston cylinder 21 is fluid-actuated in a conventional manner.

The shoes that hold the pads 22 and 23 are adapted for sliding along stud portions 24 of caliper bolts 25 and 26, upon actuation of the brake shoes. Upon energizing the cylinder 21, the right-most shoe as viewed in FIG. 1 is urged leftward, urging the pad 22 into engagement against the surface 14 of the rotor 10, during the operation thereof, which in turn, urges the entire caliper housing 16 rightward, whereby the pad 23 is urged into engagement against the surface 13 of the rotor 10. The caliper 16 may be mounted in any suitable manner that will permit such floating movement as aforesaid, or any other type of movement.

Accordingly, it will be seen that the tool 27 is adapted for insertion through the end of the caliper 16, as illustrated in FIG. 1, for placement of the caliper over the rotor 10, with opposing pads 22 and 23, on opposite sides of the rotor 10, such that, upon removal of the tool 27, the caliper is mounted upon the rotor 10, and may then be urged even further downwardly over the rotor 10, as desired, with or without the assistance of the tool 27.

Referring now to FIGS. 2, 3 and 4, the tool 27 comprises a frame 28, having opposing carrier plates 30 and 31, that are longitudinally extensive leftward and rightward, as viewed, in FIG. 2. The right-most end of the frame 27 is inwardly bent, as best illustrated in FIG. 3, for carrying a thrust washer 31 therebetween, connected through holes thereof, with rivet heads 32, 33 being overturned. A pair of washers 34 and 35 are mounted on opposite sides of the thrust washer 31, with all of the washers 31, 34 and 35 being provided with clearance therethrough for an operating or drive screw 36 to freely pass rotationally relative thereto. The drive screw 36 is provided with transverse holes for receiving spring pins 37 and 38, such that, upon rotation of the handle 40, and consequent rotation of the drive screw 36, the drive screw 36 will be restrained against longitudinal movement relative to the frame or carrier means 28.

The left-most ends of the carrier plates 30 and 31 are provided with a pin 41, extending transversely thereof, and connecting the same, having pin ends bent over, as illustrated, in rivet-like arrangement, and with four spreader plates 42, 43, 44 and 45, mounted on the pin 41, in pairs, with the plates 42 and 43 forming one pair, and the plates 44 and 45 forming another pair, and with each pair, when viewed in the expanded form of FIG. 2, being generally of X-shaped configuration, and terminating in longitudinally outward jaw portions 46 and 47, and longitudinally inward jaw portions 48 and 50. The jaw portions 46, 47, 48 and 50 are each provided with shoe-engaging edges 51, as illustrated. The plates 42, 43, 44 and 45 are adapted for movement about the shaft or pin 41, between the full line position illustrated in FIG. 2, and the phantom line position illustrated therein, wherein such plates are aligned, between, and substantially of the thickness of the carrier plates 30 and 31. A stud 52 is provided, between the pairs of spreader plates as illustrated in FIG. 3, mounted on the shaft 41, and, in turn, has springs 53 and 54 mounted thereon, at opposite sides thereof, with ends of the springs 53 and 54, in engagement with slots 55 of the spreader plates, as illustrated in FIGS. 2 through 4. The springs 53 and 54 thus serve to urge the spreader plates toward the phantom line position illustrated in FIG. 2, or the full line position illustrated in FIG. 4.

At the left-most end of the drive screw 36, the screw is threaded at 56, and in threaded engagement with a nut 57, mounted thereon, with the nut 57 having pin-like cam portions 58 and 60 extending outwardly thereof, for engagement between forklike rearward legs of pairs of the plates 42, 43, 44 and 45, against cam surfacelike edges 61 and 62 thereof, as illustrated in FIG. 2, upon leftward movement of the nut 57 relative to the drive screw 36. The nut 57, at its outer most ends, is provided with guide pins 63 and 64, in sliding engagement within slots 65 of the carrier plates 30 and 31, secured therein by suitable lock washers 66 or the like.

It will thus be clear that, upon rotation of the handle 40, and consequent rotation of the drive screw 36, the nut 57 is driven leftward, with its opposite ends slidable within the slots 65 of the carrier frame 28, such that the cam portions 58 and 60 engage between rearward legs of each pair of separating plates, and, upon further leftward movement of the nut 57, separate the jaws 48 and 50, causing a transverse or outward movement of the same as the plates pivot about the shaft 41, thereby also causing outward movement of the forward jaws of the plates, into engagement against shoe pads 22 and 23, for applying separating forces evenly for urging such pads apart.

It will further be apparent that various modifications may be made in the details of construction, as well as in the use and operation of the tool of this invention, all within the spirit and scope of the invention as defined in the appended claims.

What is claimed is:

1. A hand tool for separating opposing shoes of disc brakes wherein the shoes are caliper mounted, for mounting of the caliper on a rotor with a shoe on each side of the rotor, comprising elongated carrier means, a rotatable handle at one end of said carrier means, a pin carried by said carrier means at an opposite end thereof, elongated spreader plates each carried on said pin for pivotal movement relative thereto in directions opposing each other, and each having forward jaw portions longitudinally extensive beyond the ends of said carrier means opposite to said handle, said spreader plates being movable from retracted positions generally parallel to each other and to said carrier means, to expanded positions with their jaw portions pivoted transversely outwardly of said carrier means, cam means in engagement with said spreader plates for urging separation of said jaw portions thereof, drive means carried by said handle, said drive means having one end in engagement with said cam means and an opposite end in engagement with said handle, whereby actuation of said handle is adapted to actuate said cam means.

2. The tool of claim 1, wherein each said spreader plate is provided with a rearward jaw portion at an end of an associated spreader plate closest to said handle, with said cam means in engagement with spreader plate edge portions between said jaw portions for outwardly spreading said jaw portions.

3. The tool of claim 2, wherein said spreader plates taken together comprise an X-shaped configuration of two legs connected at the approximate center on said pin with said jaw portions comprising terminal portions of said legs.

4. The tool of claim 3, wherein said cam means comprises a pin slidably carried by said carrier means.

5. The tool of claim 3, wherein said carrier means comprises a pair of spaced carrier plates with longitudinally slotted means in each of said plates, and with said cam means being carried between said carrier plates for longitudinal movement.

6. The tool of claim 1, wherein said drive means comprises a longitudinally extensive rotatable member adapted for rotation relative to said carrier means upon turning said handle, said rotatable member being threaded at a forward end thereof for threaded engagement with said cam means.

7. The tool of claim 6, wherein said spreader plates taken together comprise an X-shaped configuration of two legs connected at the approximate center on said pin with said jaw portions comprising terminal portions of said legs, wherein a rearward end of said drive means is carried by said carrier plates, with means in cooperation with said rotatable member and said carrier plates for securing said rotatable member against longitudinal movement upon rotation thereof.

8. The tool of claim 3, including spring means in engagement with said legs biasing said legs toward a retracted position.

9. The tool of claim 3, wherein there are two pairs of said spreader plates, each pair being of said X-shaped configuration, said pairs being spaced laterally along said pin.

10. The tool of claim 5, including spring means in engagement with said legs biasing said legs toward a retracted position, wherein said cam means comprises a pinlike member slidably carried by said carrier means, wherein said drive means comprises a longitudinally extensive rotatable member adapted for rotation relative to said carrier means upon turning said handle, said rotatable member being threaded at a forward end thereof for threaded engagement with said cam means, wherein a rearward end of said drive means is carried by said carrier plates, with means in cooperation with said rotatable member and said carrier plates for securing said rotatable member against longitudinal movement upon rotation thereof, wherein there are two pairs of said spreader plates, each pair being of said X-shaped configuration, said pairs being spaced laterally along said pin.

11. A tool for separating elements such as disc brake shoes or the like that are in opposition to each other, comprising elongated carrier means, a rotatabily handle at one end of said carrier means, a pin carried by said carrier means at an opposite end thereof, elongated spreader plates each carried on said pin for pivotal movement relative thereto in directions opposing each other, and each having forward jaw portions longitudinally extensive beyond the end of said carrier means opposite to said handle, said spreader plate being movable from retracted positions generally parallel to each other and to said carrier means to expanded positions with their jaw portions pivoted transversely outwardly of said carrier means, cam means in engagement with said spreader plates for urging separation of said jaw portions thereof, drive means carried by said handle, said drive means having one end in engagement with said cam means and an opposite end in engagement with said handle, whereby actuation of said handle is adapted to actuate said cam means.

* * * * *